(12) United States Patent  (10) Patent No.: US 7,409,136 B2
Kanou et al.  (45) Date of Patent: Aug. 5, 2008

(54) RETENTION RELEASE AUXILIARY DEVICE FOR OPTICAL CONNECTOR AND PRINTED CIRCUIT BOARD DEVICE

(75) Inventors: Kouji Kanou, Fukuoka (JP); Hiroyuki Shouyama, Fukuoka (JP); Masahiko Kondo, Fukuoka (JP); Yoshiyuki Nakayama, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/907,821

(22) Filed: Oct. 17, 2007

(65) Prior Publication Data

US 2008/0112671 A1 May 15, 2008

(30) Foreign Application Priority Data

Nov. 15, 2006 (JP) .............................. 2006-309337

(51) Int. Cl.
*G02B 6/36* (2006.01)
*G02B 6/00* (2006.01)

(52) U.S. Cl. .................... 385/134; 385/139; 385/76; 385/53

(58) Field of Classification Search .................. 385/53, 385/76–94, 134, 139, 147
See application file for complete search history.

(56) References Cited

U.S. PATENT DOCUMENTS

| 6,017,153 A | 1/2000 | Carlisle et al. |
| 2008/0044136 A1* | 2/2008 | Kanou et al. .................. 385/39 |

FOREIGN PATENT DOCUMENTS

| JP | 11-64682 | 3/1999 |
| JP | 3390697 | 1/2003 |
| JP | 2005-17602 | 1/2005 |

* cited by examiner

*Primary Examiner*—Kevin S Wood
(74) *Attorney, Agent, or Firm*—Staas & Halsey LLP

(57) ABSTRACT

A release auxiliary device (6) includes a cover part (51) that is provided movably with respect to a receptacle (11) along the insertion/removal direction of a plug (12), and an inclined pressing part (52) that is provided in the cover part (51) and is touchable, from a lower side, to an end portion (41a) of a lever (41). The inclined pressing part (52) presses against the end portion (41a) of the lever (41) and moves the lever by moving the cover part (51) in a direction in which the plug (12) is detached, enabling release of engagement between engaging portions (42, 28).

5 Claims, 9 Drawing Sheets

RETENTION RELEASE AUXILIARY DEVICE FOR OPTICAL CONNECTOR AND PRINTED CIRCUIT BOARD DEVICE

BACKGROUND OF THE INVENTION

1. Field of the Invention

The present invention relates to a retention release auxiliary device for an optical connector including a plug to which an optical fiber is coupled and a receptacle into which the plug is inserted.

2. Description of the Related Art

Along with expansion of information networks in recent years, optical fiber communication has become mainstream. Further, it is required to increase the number of optical lines and the density thereof.

A communication device is installed in each node of an optical communication system. A printed circuit board having a function of housing an optical line and controlling the same is mounted on a rack shelf of the communication device. An interface optical connector is mounted on the printed circuit board and an optical fiber is detachably connected to the optical connector. Such optical connectors having various shapes are proposed or standardized (see Japanese unexamined patent publication Nos. 2005-17602 and 11-64682 and Japanese patent No. 3390697). For example, an LC type connector that can be decreased in size and increased in density is normally used in a communication carrier in North America.

Such an optical connector has a latch mechanism for retention. A plug to which an optical fiber is connected is inserted into a receptacle and thereby the latch mechanism operates automatically, ensuring the coupling between the plug and the receptacle. When a lever provided in the plug is operated by fingers to release the latch mechanism, the plug can be detached from the receptacle.

Upon the detachment of the plug, in the case of an environment where a sufficient space is secured, it is easy to operate a small lever with fingers and release the latch mechanism. However, it is not easy in the case where an optical connector is mounted in a small space.

Specifically, usually, a plurality of the printed circuit boards described above are densely mounted on a shelf. In the case where, for example, a plurality of the printed circuit boards are made adjacent to one another and are installed in a slot, a receptacle of an optical connector is attached to a step-like front plate that is fastened to each of the printed circuit boards. In this case, it is necessary to house also an extension area of an optical fiber connected to the optical connector in an area within the shelf. Accordingly, it necessarily follows that the mounting position of the optical connector is a position back from the shelf surface. Under this condition, it is difficult to put fingers in order to attach/detach the plug. In particular, it is hard to operate the lever with fingers to release the latch mechanism.

For this reason, upon the detachment of the plug, a tool is conventionally necessary to release the latch mechanism.

SUMMARY

The present disclosure is directed to solve the problems pointed out above, and therefore, an object of an embodiment of the present invention is to improve operability for retention release of an optical connector used for connection of an optical fiber. Another object of an embodiment of the present invention is to facilitate attachment/detachment of a plug even in the case where an optical connector is provided in a small space.

A device according to one aspect of the present invention is a retention release auxiliary device for an optical connector, the optical connector including a plug to which an optical fiber is coupled and a receptacle into which the plug is inserted. The plug is provided with a lever on a front side of a body of the plug, the lever being elastically deformable to approach the body of the plug by operating an end portion of the lever with fingers. An engaging portion formed in the lever engages with an engaging portion provided in the receptacle, leading to retention of the engaging portion of the lever and the engaging portion of the receptacle. The lever is caused to be deformed against an elastic force thereof by operating the end portion of the lever with fingers, so that the engagement between the engaging portions is released, enabling detachment of the plug from the receptacle. The retention release auxiliary device includes a cover part that is provided movably with respect to the receptacle along an insertion/removal direction of the plug, and an inclined pressing part that is provided in the cover part and is touchable, from a lower side, to the end portion of the lever. The inclined pressing part presses against the end portion of the lever and moves the lever by moving the cover part in a direction in which the plug is detached, enabling release of the engagement between the engaging portions.

In the case where the plug is pulled out, a user preferably moves the cover part in the direction where the plug is pulled out. Thereby, the inclined pressing part presses against the end portion of the lever and moves the lever, so that the engagement between the engaging portions is released.

Preferably, the cover part may include an upper cover part and three legs that project from a lower surface of the upper cover part and are disposed around three sides of the body of the plug. The three legs may be movable by inserting the three legs into holes that are provided on a front plate fixedly disposed with respect to the receptacle.

Further, each of the three legs may have a plate-like shape and, of the three legs, the two external legs may have surfaces that are provided in parallel to each other, and one of the legs that is disposed between the two external legs may have a surface that is provided perpendicular to the surfaces of the two external legs. The two external legs may be provided with stopper projections for limiting an area where each of the two external legs can move with respect to the holes on the front plate.

The structure described above can improve operability for retention release of an optical connector used for connection of an optical fiber. In addition, the structure described above can facilitate attachment/detachment of a plug even in the case where an optical connector is provided in a small space.

These and other characteristics and objects of the present invention will become more apparent by the following descriptions of preferred embodiments with reference to drawings.

DESCRIPTION OF THE PREFERRED EMBODIMENTS

Figure 1:
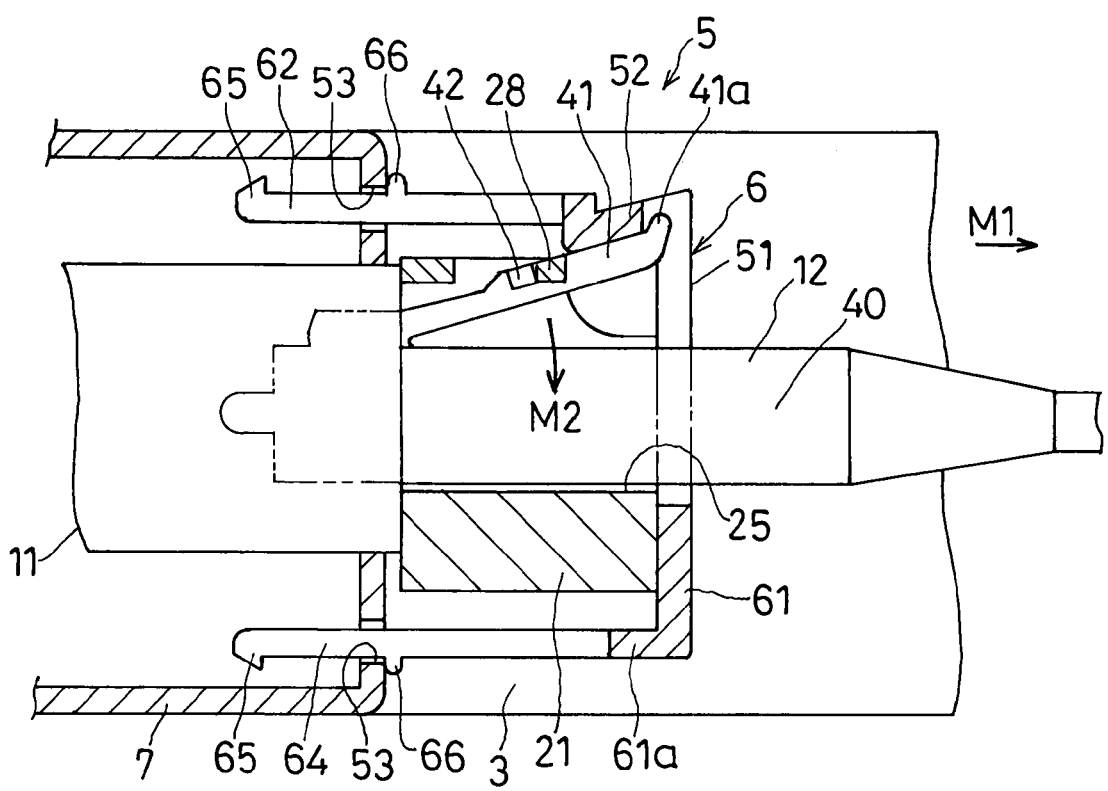
FIG. 1 is a front cross sectional view showing a part of a release auxiliary device according to the present invention.

Referring to FIGS. 1-4, a front plate (also referred to as a surface plate) 7 that is made of a thin metal plate or others and formed in a step-like shape is attached to the printed circuit board 3. The optical connector 5 and the release auxiliary device 6 are attached to the front plate 7. Note that the printed circuit board 3 is one of a plurality of the printed circuit boards mounted within a rack shelf of a communication device (not shown). The printed circuit boards are densely disposed in parallel to one another.

The optical connector 5 shown in this embodiment is a duplex optical connector in which two receptacles are formed to be integral with each other and a plug coupled to an optical fiber is inserted into each of the receptacles. Since the receptacles have the same structure and the plugs have the same structure, a description is given here of one of the receptacles and one of the plugs.

As described above, the optical connector 5 includes the plug 12 to which the optical fiber HF is coupled and the receptacle 11 into which the plug 12 is inserted. The optical connector 5 itself is a well-known LC type optical connector. Accordingly, since the shape, the structure, the operation method of each of the receptacle 11 and the plug 12 themselves are known, only a brief description is given here.

Figure 4:
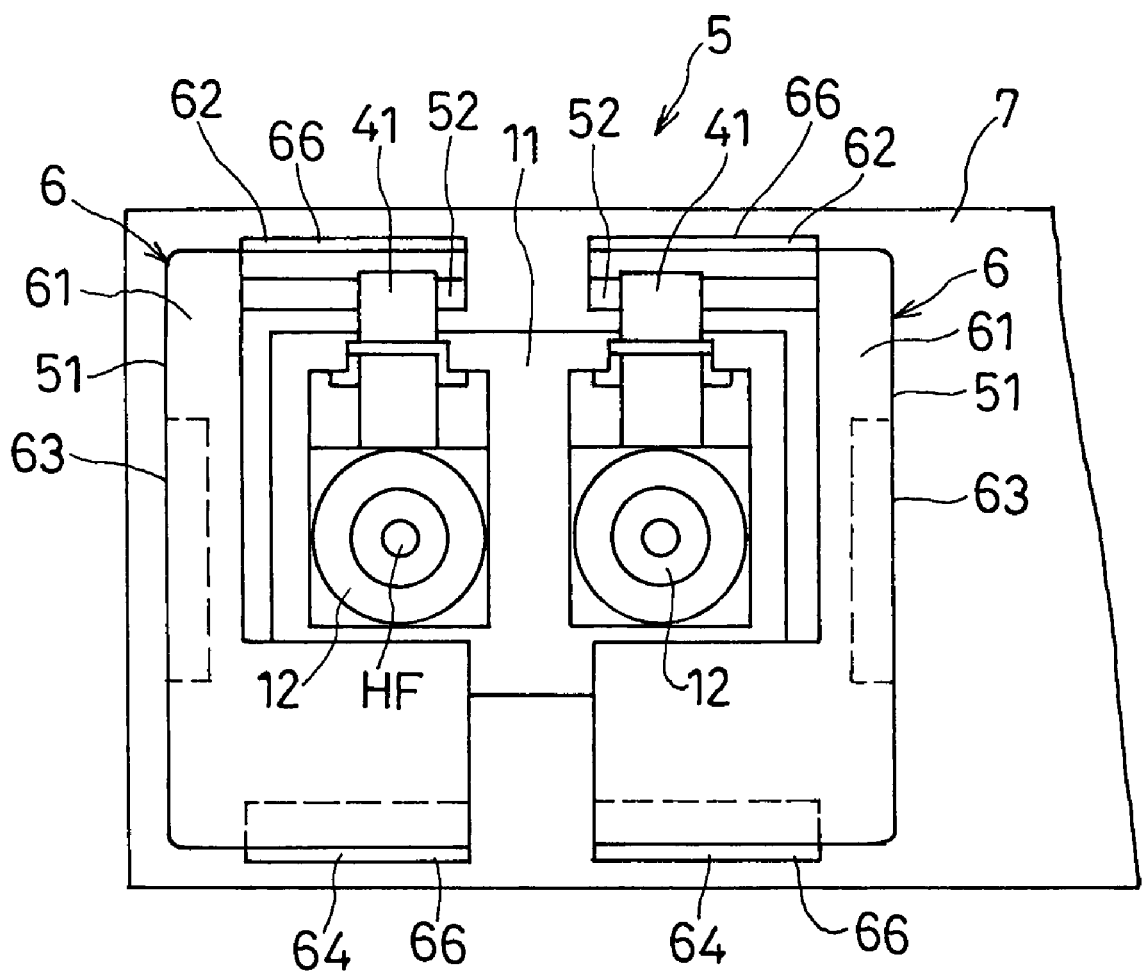
FIG. 4 is a right side view of a printed circuit board.

The plug 12 of the optical connector 5 is inserted from directly above the receptacle 11 shown in FIG. 4 and is connected to the receptacle 11. For this structure, the optical connector 5 is attached in a manner to project from the front plate 7. In order to detach the plug 12 from the receptacle 11, the plug 12 should be pulled while operating the release auxiliary device 6 with fingers.

The receptacle 11 shown in FIGS. 1-4 constitutes some of a part (SFP part) including a photoelectric conversion circuit (not shown). Instead, however, receptacles having various structures other than the receptacle 11 can be used. Such a receptacle 11B having a different structure is shown in FIGS. 8 and 9.

Figure 8:
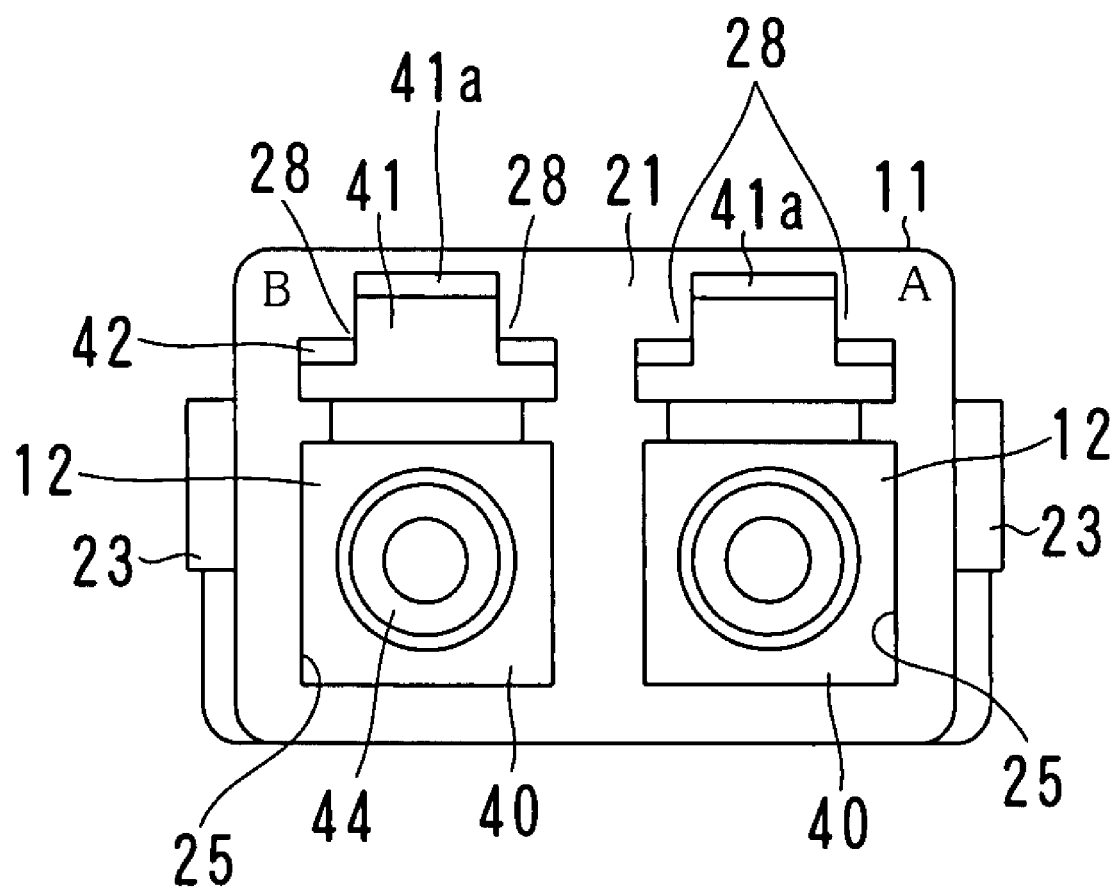
FIG. 8 is a right side view of an optical connector.
Figure 9:
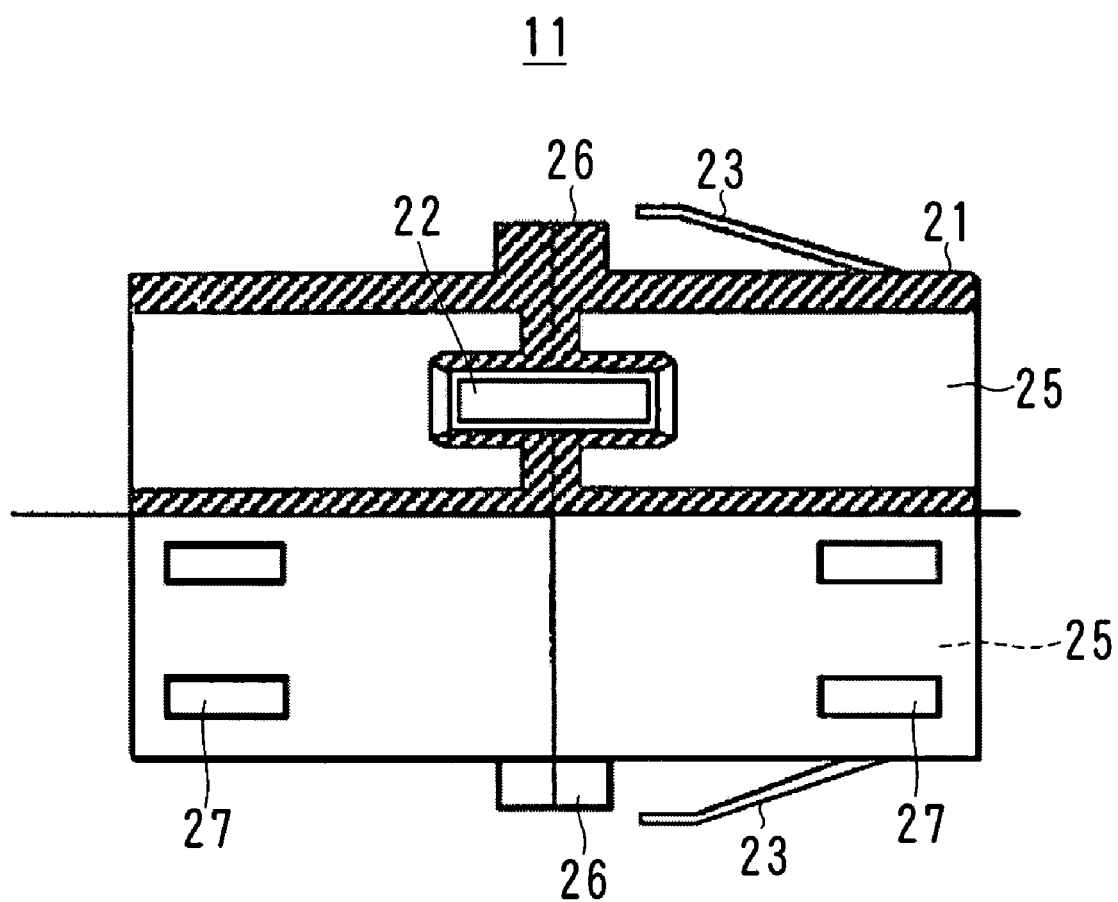
FIG. 9 is a top sectional view of an optical connector.

Referring to FIGS. 8 and 9, the receptacle 11B includes a housing 21 that is made of synthetic resin and has a rectangular parallelepiped shape, a split sleeve 22 that is made of zirconia or the like and provided in the middle of the inside of the receptacle 11 and a fastener 23 that is made of a spring material. The housing 21 is provided with two holes 25. The plugs 12 are inserted from openings provided on both sides of the respective holes 25. An LC ferrule 43 that is provided in an end portion of each of the two plugs 12 inserted from the both sides into the same hole 25 touches to (abuts against) an end surface of the split sleeve 22 and is optically coupled to the optical fiber HF.

In order to attach the receptacle 11B to the front plate 7, a side of the receptacle 11B in which the fastener 23 is provided is inserted from the rear side of the front plate 7 into a rectangular hole provided on the front plate 7. An edge of the fastener 23 and a collar 26 provided in the housing 21 sandwich the front plate 7 at a position where the fastener 23 penetrates to the front side of the front plate 7. Thereby, the receptacle 11B is fixed to the front plate 7. A part of the wall surfaces of the housing 21 is provided with slit windows 27 leading to the holes 25.

The housing 21 has an inner surface that has a shape adapted to hold the plug 12 when the plug 12 is inserted. For example, the hole 25 of the housing 21 has a shape substantially the same as the cross-sectional shape of a body 40 of the plug 12. Further, projections 28 are formed which have a function of engaging with engaging convex portions 42 provided on both sides of a lever 41 of the plug 12 and serve as stoppers of the engaging convex portions 42 (see FIG. 1).

In the receptacle 11 shown in FIGS. 1-4, parts having the same function as those of the receptacle 11B shown in FIGS. 8 and 9 are given the same reference numerals.

The following is a description of the plug 12 with reference to FIG. 7.

Figure 7A:
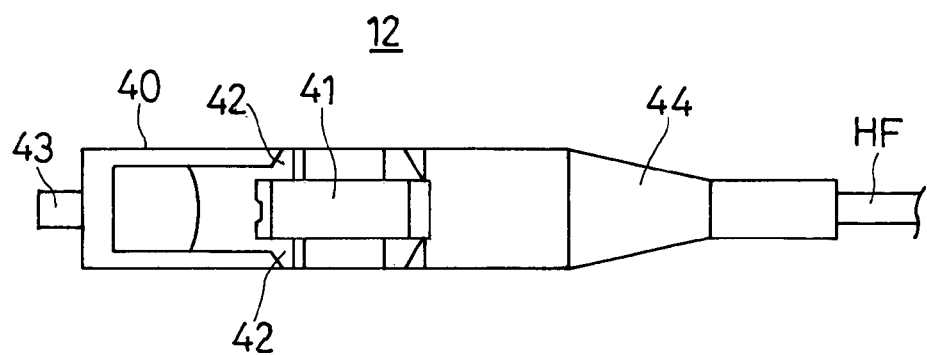
FIG. 7A is a plan view of a plug constituting an optical connector and FIG. 7B is a front view of the same.
Figure 7B:
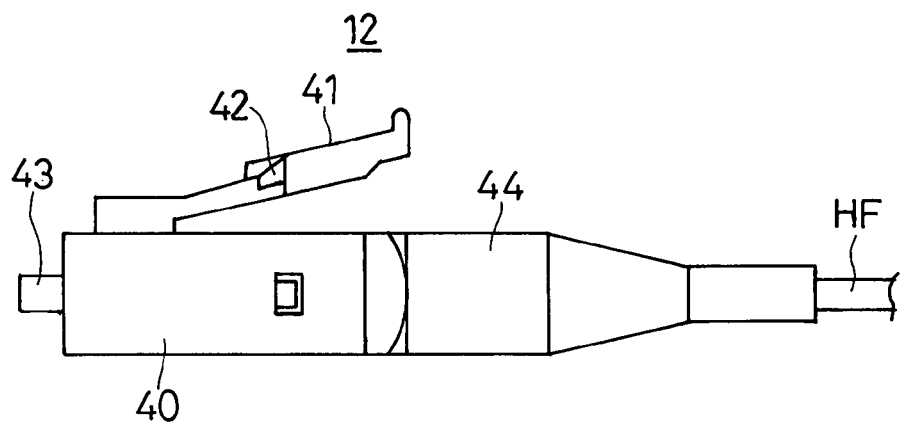

Referring to FIGS. 7A and 7B, the body 40 of the plug 12 is made of synthetic resin and is like a prism having a substantially square cross section. The lever 41 described above is formed to be integral with the body 40 on a side surface thereof on the front side. The lever 41 has elasticity and is capable of being deformed elastically to be close to the body 40 of the plug 12 by operating an end portion 41a of the lever 41 with fingers or the like. The engaging convex portions 42 are provided on both end surfaces in almost the center of the lever 41 to project from the lever 41 on both sides as shown in FIG. 7A. An end portion of the body 40 is provided with the LC ferrule 43 that is made of zirconia or the like and has a cylinder-like shape. The LC ferrule 43 is optically coupled, inside the body 40, to the optical fiber HF inserted from the rear end of the body 40. The rear end portion of the body 40 is covered with a tube 44 that serves to protect an extending part of the optical fiber HF.

Referring to FIGS. 1 and 4 again, in order to insert the plug 12 into the receptacle 11, the plug 12 is inserted into the hole 25 of the receptacle 11 as it is. Thereby, the lever 41 is pushed by the wall surface of the receptacle 11 and deforms elastically, and the engaging convex portions 42 that are provided on the both sides of the lever 41 engage with the projections 28, so that the plug 12 is retained. In order to detach the plug 12 from the receptacle 11, the lever 41 is caused to be deformed against the elastic force thereof by holding the end portion 41a of the lever 41 with fingers or the like. Thereby, the engagement between the engaging convex portions 42 and the projections 28 is released, and under this state the plug 12 is detached from the receptacle 11. However, since it is not easy to operate the lever 41 directly with fingers, the lever 41 is operated through the release auxiliary device 6.

Next, referring to FIGS. 1-6, a cover part 51 and an inclined pressing part 52 of the release auxiliary device 6 is formed to be integral with each other using synthetic resin such as ABS resin. The cover part 51 is provided movably with respect to the receptacle 11 along the direction of insertion/removal of the plug 12. The inclined pressing part 52 is provided in the cover part 51 and the lower part of the inclined pressing part 52 can touch and push the end portion 41a of the lever 41. The cover part 51 is slid in the direction where the plug 12 is pulled out, i.e., in the direction shown by the arrow M1. Thereby, the inclined pressing part 52 presses against the end portion 41a of the lever 41, which moves the lever 41 in the direction shown by the arrow M2. Thereby, the engagement between the engaging convex portions 42 and the projections 28 can be released.

The cover part 51 includes an upper cover part 61 and three legs 62, 63 and 64 that project from the lower surface of the upper cover part 61 and are disposed around three sides of the body 40 of the lever 41. The three legs 62-64 are inserted into slit-like holes 53 formed on the front plate 7 and can move inside the holes 53.

All of the three legs 62-64 have a plate-like shape. Of the three legs 62-64, the surfaces of the two external legs 62 and 64 are provided in parallel to each other. The surface of the one leg 63 that is disposed between the legs 62 and 64 is provided perpendicular to the surfaces of the two external legs 62 and 64.

Each of the two external legs 62 and 64 is provided with stopper projections 65 and 66 that serve to limit the area where each of the external legs 62 and 64 can move with respect to the holes 53 on the front plate 7. The inclined pressing part 52 is formed in the root part of the one external leg 62.

As described earlier, since the receptacle 11 according to this embodiment is duplex, the two plugs 12 can be inserted into the receptacles 11 side by side. As clearly shown in FIGS. 3 and 4, the two release auxiliary devices 6 and 6 are provided, so that the levers 41 of the two plugs 12 can be operated separately. The two release auxiliary devices 6 and 6 have completely the same function although they have symmetrical shapes.

The following is a further detailed description of the release auxiliary device 6.

Figure 5:
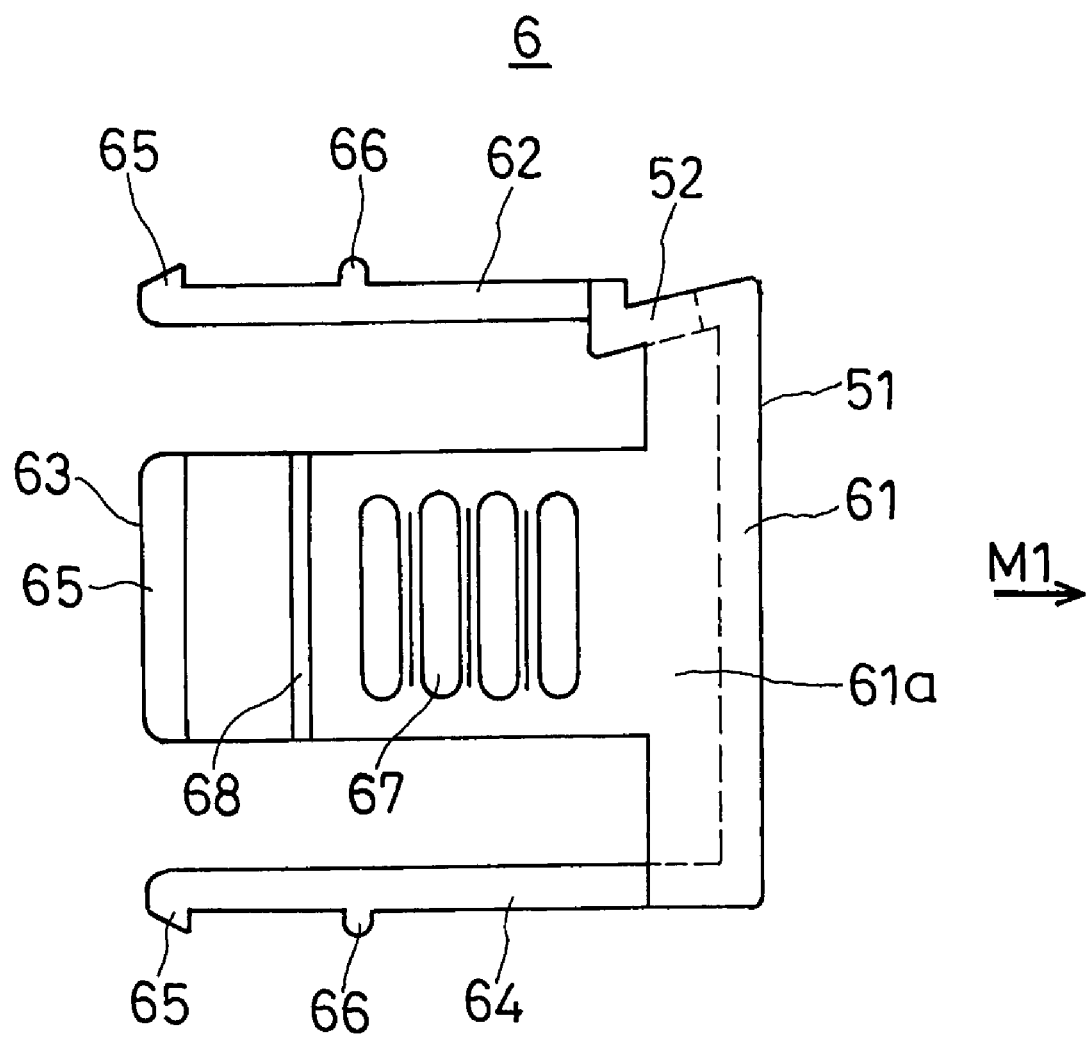
FIG. 5 is a front view of a release auxiliary device.
Figure 6:
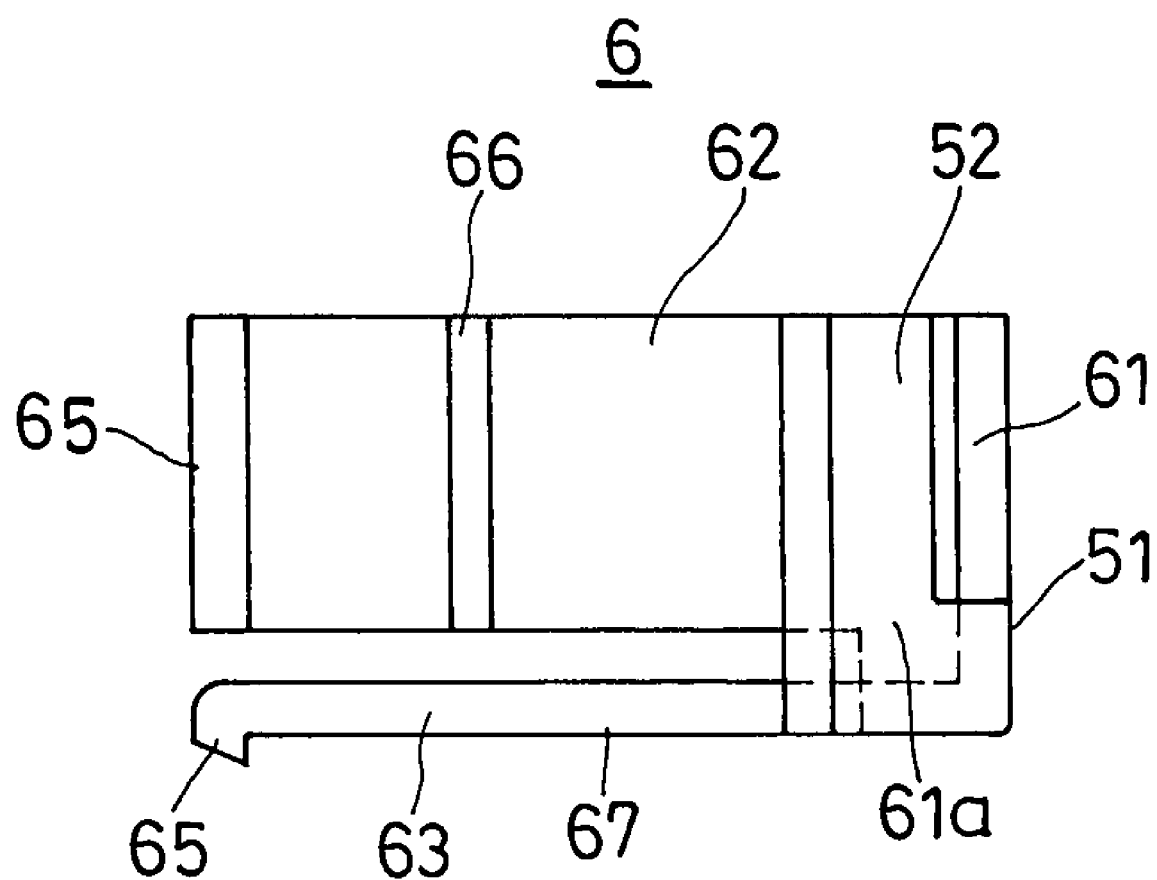
FIG. 6 is a plan view of a release auxiliary device.

As clearly shown in FIGS. 4-6, the upper cover part 61 is formed by cutting a rectangular flat plate to prevent interference with the optical connector 5, then to have a substantially L-shape as viewed from the top. A rib 61a is disposed around three sides of the upper cover part 61 and the legs 62-64 described above are provided to extend from the rib 61a. The inclined pressing part 52 described above is provided in the root part of the leg 62 of the rib 61a.

The inclined pressing part 52 is formed to have a long ribbon-like shape along the width direction of the leg 62. The inclined pressing part 52 has an inner surface with a slope. That is, the inner surface has an angle with respect to the sliding direction of the release auxiliary device 6, i.e., the direction shown by the arrow M1. In the state where the release auxiliary device 6 is inserted (the state shown in FIG. 1), i.e., in the state where the stopper projections 66 of the legs 62 and 64 abut against the surface of the front plate 7, the surface of the lever 41 is along the surface of the inclined pressing part 52 and the end portion 41a is positioned around the upper edge of the inclined pressing part 52. In this state, the engaging convex portions 42 of the lever 41 engage with the projections 28 of the housing 21 of the receptacle 11. Accordingly, the plug 12 cannot move even if it is pulled.

As shown in FIG. 5, the middle leg 63 has, on its surface, an operating part 67 in which concavities and convexities are formed for slip resistance. Specifically, the release auxiliary device 6 can be slid along the direction shown by the arrow Ml by gently pressing the operating part 67 with fingers and pulling or pushing the operating part 67. Further, a projection-like latch portion 68 is provided in the lower part of the operating part 67. In the case where the release auxiliary device 6 is in the position shown in FIG. 1 (the normal position), the latch portion 68 contacts the rear surface of the front plate 7 or the periphery of the hole 53 lightly and prevents the unexpected movement of the release auxiliary device 6 due to vibration or the like. However, in the case where a user attempts to slide the release auxiliary device 6 with fingers, the latch portion 68 can pass within the hole 53.

If the release auxiliary device 6 is moved from the state shown in FIG. 1 to the direction shown by the arrow Ml, then the end portion 41a of the lever 41 reaches the surface of the inclined pressing part 52, is pressed by the inclined pressing part 52, then to move in the direction shown by the arrow M2. Then, if the release auxiliary device 6 is moved to the position shown in FIG. 2 (the release position), the engagement between the engaging convex portions 42 and the projections 28 is released. Under this state, the plug 12 is pulled in the direction shown by the arrow M1, so that the plug 12 can be detached from the receptacle 11 easily.

Figure 2:
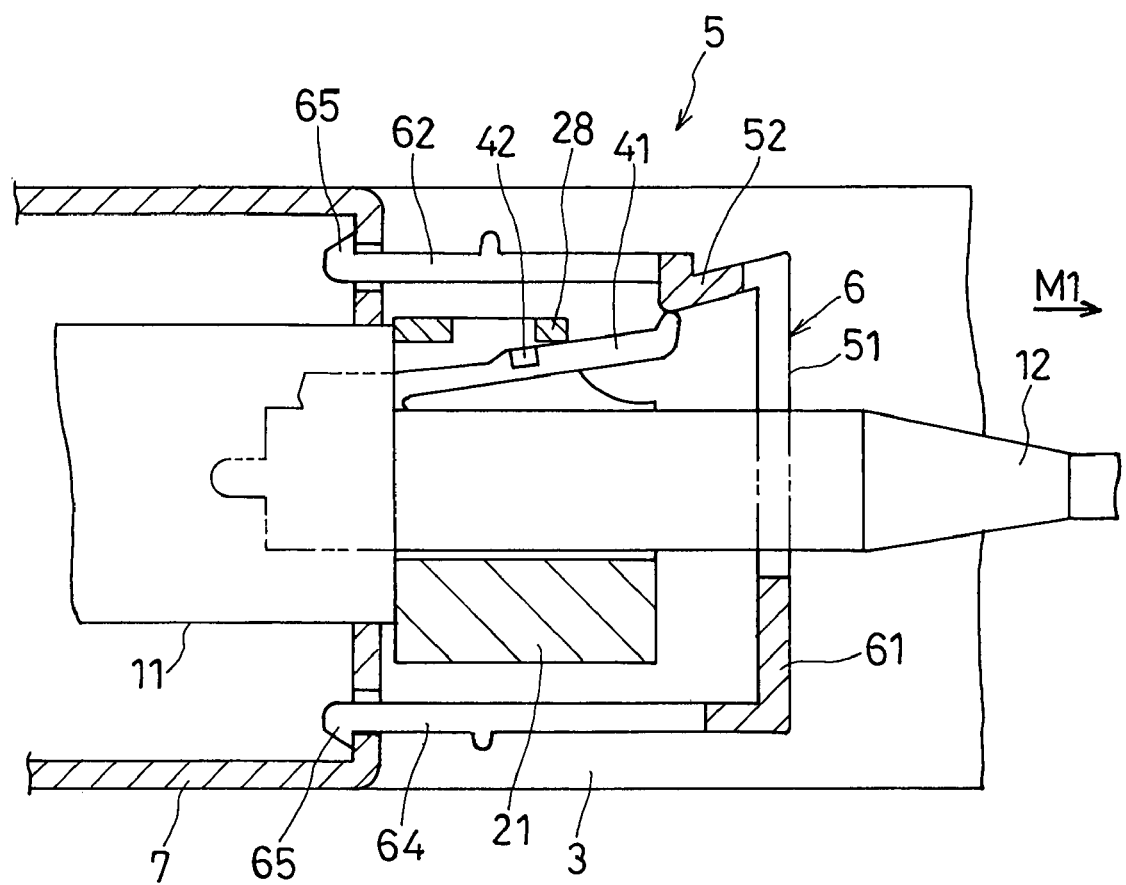
FIG. 2 is a diagram showing a state in which a lever is released with the release auxiliary device shown in FIG. 1.
Figure 3:
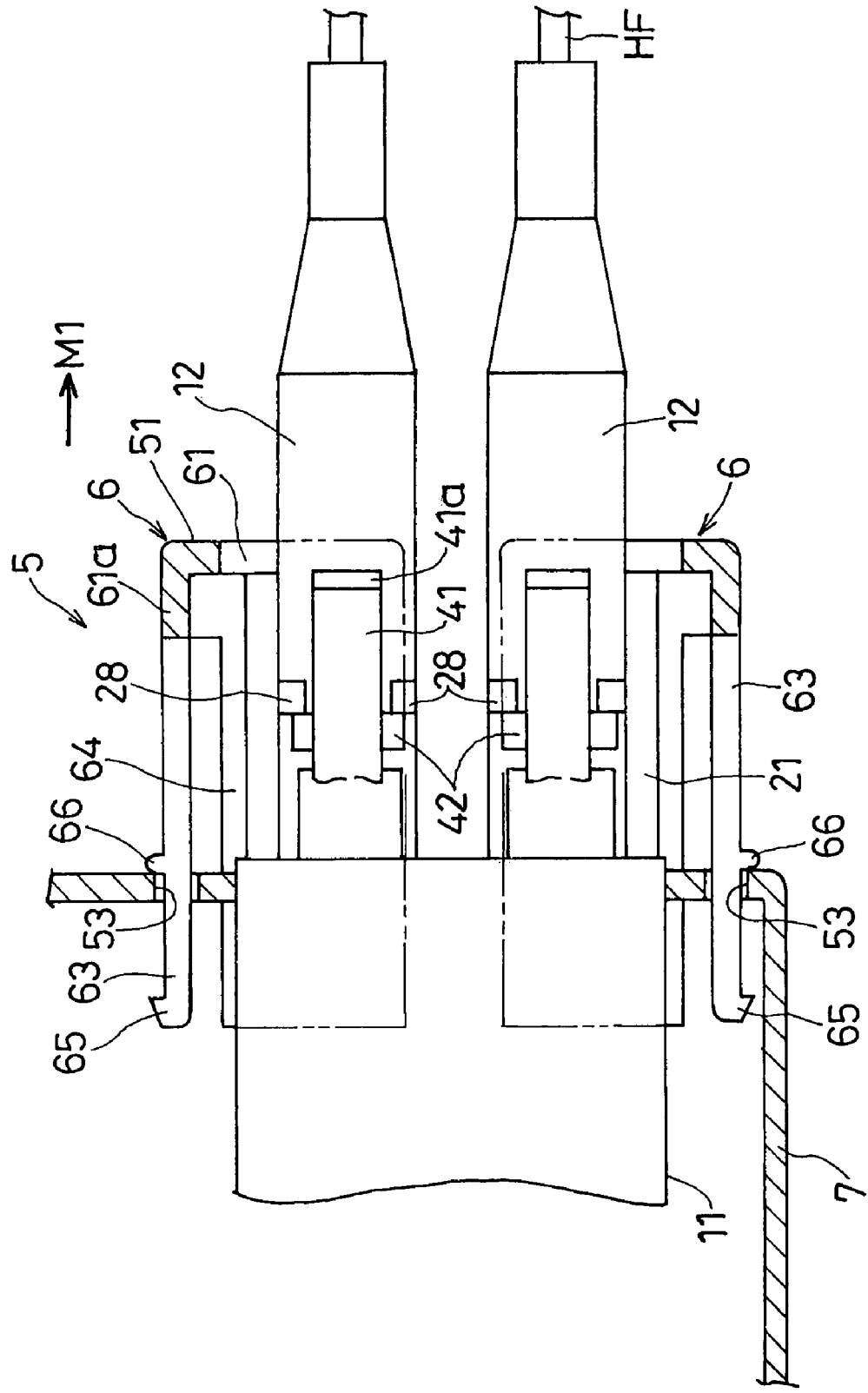
FIG. 3 is a plan view of a printed circuit board.

In the state shown in FIG. 2, since the stopper projections 65 of the legs 62 and 64 catch on the rear surface of the front plate 7, the legs 62-64 cannot be pulled out of the holes 53. However, if the cover part 51 is pulled strongly, the legs 62-64 and the stopper projections 65 deform elastically, so that the release auxiliary device 6 can be removed from the front plate 7. Further, in the case where the release auxiliary device 6 is attached to the front plate 7, the stopper projections 65 of the respective legs 62-64 are preferably pushed in the holes 53. At this time, it is preferable that, first, the stopper projection 65 of the middle leg 63 is pushed in the hole 53 and, next, the stopper projections 65 of the external legs 62 and 64 are pushed in the holes 53. The release auxiliary device 6 is so produced that the respective legs 62-64 open slightly outwardly when they are in the free state.

In this way, in the case where the plug 12 is detached, a user puts fingers on the operating part 67 of the cover part 51 from the outside of the body 40 of the plug 12 and slides the entire release auxiliary device 6. In the case where the two plugs 12 are detached at the same time, a user holds the operating parts 67 of the two release auxiliary devices 6 with fingers and slides the same at the same time. Thereby, the retention of the optical connector 5 can be released easily and the plug 12 can be detached from the receptacle 11 easily. In the case where the plug 12 is newly inserted into the receptacle 11, the release auxiliary device 6 is pushed to be returned to the position shown in FIG. 1.

Thus, even in the case where the optical connector 5 is attached in a small space, a space necessary for operation for releasing the engagement of the lever 41 can be easily secured. Further, interference due to the touch of fingers on the plug 12 does not occur and a user can easily release the engagement of the lever 41 with easy operation.

In the case where the receptacle 11 is simplex, only a single release auxiliary device 6 may be provided. Further, even in the case where the receptacle 11 is duplex or more, the release auxiliary devices 6 may be provided only in the necessary positions.

In the embodiment described above, the release auxiliary device 6 is movably attached with respect to the front plate 7. For that purpose, the three slit-like holes 53 are provided for one release auxiliary device 6. Instead, however, another structure is possible in which a square frame-like plate having such three slit-like holes 53 is prepared separately and the plate is fastened to the outer circumference of the receptacle 11 or to the front plate 7.

The release auxiliary device 6 according to the embodiment described above is produced by molding using synthetic resin. However, it may be produced by sheet metal working of a metal sheet or press working thereof. The shape of the inclined pressing part 52 can be various shapes other than the shape described above. For example, it is possible that the inclined pressing part 52 is provided only at a part against which the lever 41 abuts, or that the outer surface of the inclined pressing part 52 is the same as that of the leg 62. In the embodiment described above, the inclined pressing part 52 is provided only in the one leg 62. However, the inclined pressing part 52 is provided also in the leg 64 and thereby the two release auxiliary devices 6 attached to the duplex receptacle 11 can be shared.

In the release auxiliary device 6 described above, the overall structure of the cover part 51, the inclined pressing part 52, the upper cover part 61, the legs 62-64, the holes 53 and the release auxiliary device 6, the structures of various portions thereof, the shape, the size, the number, and the materials thereof, and the like may be changed as needed, in accordance with the subject matter of the present invention. Further, the release auxiliary device 6 can be applied to optical connectors having various shapes and structures as the optical connector 5.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A retention release auxiliary device for an optical connector, the optical connector including a plug to which an optical fiber is coupled and a receptacle into which the plug is inserted,
    wherein the plug is provided with a lever on a front side of a body of the plug, the lever being elastically deformable to approach the body of the plug by operating an end portion of the lever with fingers,
    an engaging portion formed in the lever engages with an engaging portion provided in the receptacle, leading to retention of the engaging portion of the lever and the engaging portion of the receptacle;
    the lever is caused to be deformed against an elastic force thereof by operating the end portion of the lever with fingers, so that the engagement between the engaging portions is released, enabling detachment of the plug from the receptacle,
    the retention release auxiliary device comprises a cover part that is provided movably with respect to the receptacle along an insertion/removal direction of the plug, and an inclined pressing part that is provided in the cover part and is touchable, from a lower side, to the end portion of the lever, and
    the inclined pressing part presses against the end portion of the lever and moves the lever by moving the cover part in a direction in which the plug is detached, enabling release of the engagement between the engaging portions.

2. The device according to claim 1,
    wherein the cover part includes an upper cover part and three legs that project from a lower surface of the upper cover part and are disposed around three sides of the body of the plug, and
    the three legs are movable by inserting the three legs into holes that are provided on a front plate fixedly disposed with respect to the receptacle.

3. The device according to claim 2,
    wherein each of the three legs has a plate-like shape and, of the three legs, the two external legs have surfaces that are provided in parallel to each other, and one of the legs that is disposed between the two external legs has a surface that is provided perpendicular to the surfaces of the two external legs, and
    the two external legs are provided with stopper projections for limiting an area where each of the two external legs can move with respect to the holes on the front plate.

4. The device according to claim 3,
    wherein the inclined pressing part is formed in a root portion of one of the two external legs.

5. A printed circuit board device comprising:
    an optical connector that is mounted on a front side of a printed circuit board; and
    the retention release auxiliary device for an optical connector according to any of claims 1-4 that is attached to the optical connector.

* * * * *

UNITED STATES PATENT AND TRADEMARK OFFICE
CERTIFICATE OF CORRECTION

PATENT NO. : 7,409,136 B2  Page 1 of 1
APPLICATION NO. : 11/907821
DATED : August 5, 2008
INVENTOR(S) : Kouji Kanou et al.

It is certified that error appears in the above-identified patent and that said Letters Patent is hereby corrected as shown below:

Column 7, Line 28, change "receptacle;" to --receptacle,--.

Signed and Sealed this

Seventeenth Day of March, 2009

JOHN DOLL
*Acting Director of the United States Patent and Trademark Office*